United States Patent
Saijo et al.

(10) Patent No.: US 10,879,784 B2
(45) Date of Patent: Dec. 29, 2020

(54) MOTOR CONTROL DEVICE

(71) Applicant: JTEKT CORPORATION, Osaka (JP)

(72) Inventors: Masato Saijo, Okazaki (JP); Masataka Tsujihashi, Okazaki (JP); Tomohiro Niwa, Okazaki (JP); Masashi Fuji, Toyota (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/562,909

(22) Filed: Sep. 6, 2019

(65) Prior Publication Data
US 2020/0083797 A1    Mar. 12, 2020

(30) Foreign Application Priority Data

Sep. 11, 2018  (JP) .................................. 2018-169463

(51) Int. Cl.
  *H02M 1/14*      (2006.01)
  *H02P 23/14*     (2006.01)
  *H02M 1/00*      (2006.01)

(52) U.S. Cl.
  CPC ............ *H02M 1/143* (2013.01); *H02P 23/14* (2013.01); *H02M 2001/0029* (2013.01)

(58) Field of Classification Search
  CPC ......... H02M 1/143; H02M 2001/0029; H02M 23/14; H02M 1/00; H02M 1/04; H02M 1/163; H02M 1/18; H02M 1/24; H02M 1/26; H02M 1/42; H02M 1/46; H02M 3/00; H02M 6/00; H02M 6/12; H02M 6/28; H02M 7/29; H02M 21/00; H02M 21/22; H02M 23/00; H02M 23/0027; H02M 23/0004; H02M 27/00; H02M 27/04;
(Continued)

(56) References Cited

U.S. PATENT DOCUMENTS 10,205,416 B2 *  2/2019  Furukawa ................ H02P 6/16
10,267,819 B2 *  4/2019  Son ........................ G06F 3/0673
(Continued)

FOREIGN PATENT DOCUMENTS

EP    3 264 591 A1   1/2018
JP    2017-158230 A   9/2017

OTHER PUBLICATIONS

Dec. 9, 2019 Extended Search Report issued in European Patnt Application No. 19196176.2.

*Primary Examiner* — Antony M Paul
(74) *Attorney, Agent, or Firm* — Oliff PLC

(57) ABSTRACT

If a B system microcomputer is reset and reactivated while an A system microcomputer is operating normally, tasks of the A system microcomputer and tasks of the B system microcomputer can be synchronized. The B system microcomputer is reset when voltage applied to a battery decreases and falls below an operation guarantee voltage. Thereafter, when the applied voltage becomes equal to or higher than the operation guarantee voltage and the B system microcomputer is activated, the B system microcomputer outputs a request signal for requesting a synchronization signal to the A system microcomputer. The A system microcomputer outputs the synchronization signal synchronized with a periodic task. The B system microcomputer determines an execution timing of the periodic task based on the synchronization signal.

6 Claims, 6 Drawing Sheets

(58) Field of Classification Search
CPC ........ H02M 27/06; H02M 27/08; H02M 1/50; H02M 19/12
USPC .......... 318/400.01, 700, 705, 706, 707, 800, 318/801, 430
See application file for complete search history.

(56) References Cited

U.S. PATENT DOCUMENTS

| | | | |
|---|---|---|---|
| 2015/0214864 A1* | 7/2015 | Sopko | ........................ H02P 5/52 318/3 |
| 2017/0237377 A1* | 8/2017 | Furukawa | ............... H02P 29/00 318/564 |

* cited by examiner

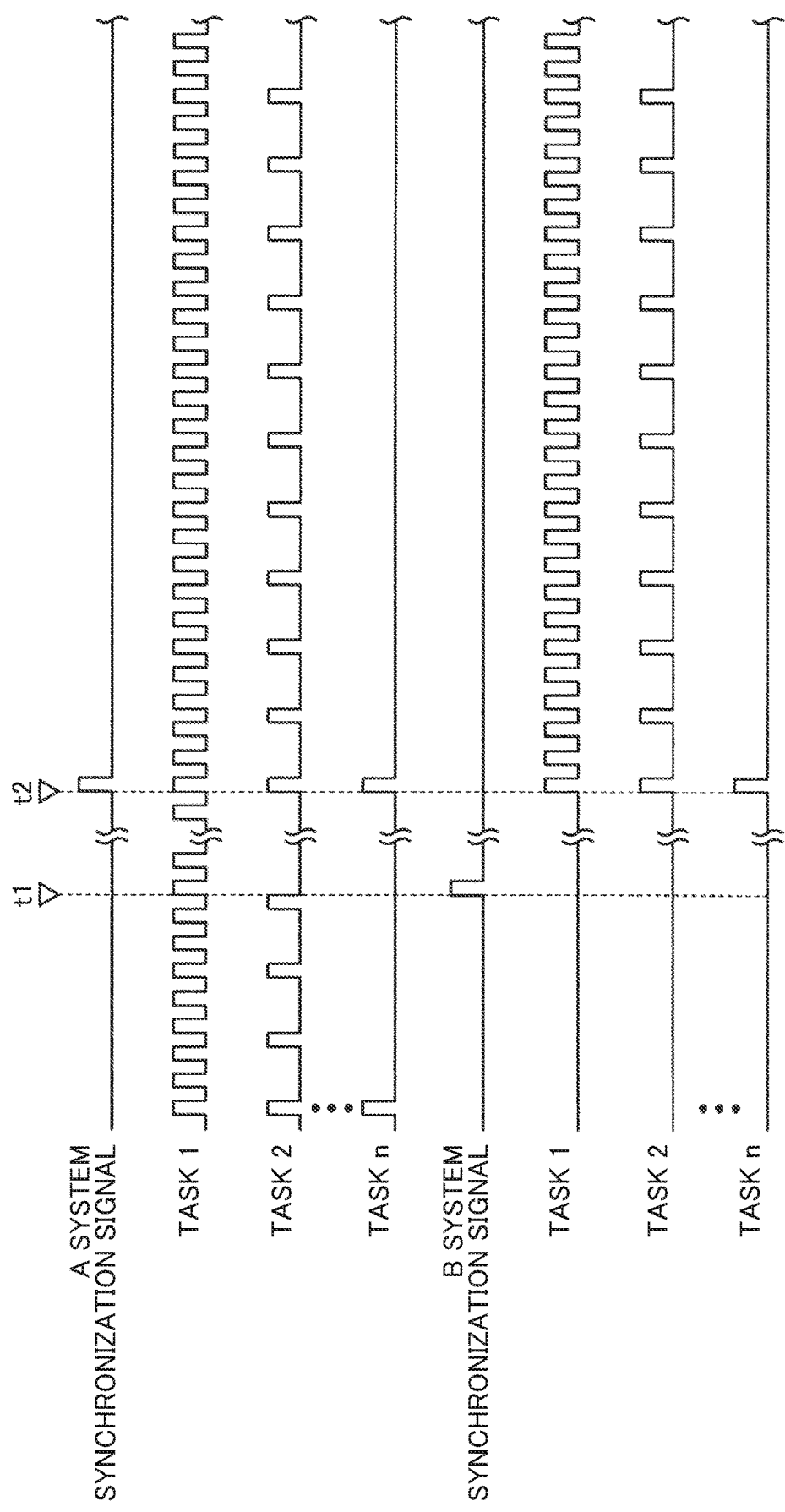

MOTOR CONTROL DEVICE

INCORPORATION BY REFERENCE

The disclosure of Japanese Patent Application No. 2018-169463 filed on Sep. 11, 2018 including the specification, drawings and abstract, is incorporated herein by reference in its entirety.

BACKGROUND OF THE INVENTION

1. Field of the Invention

The present invention relates to a motor control device that controls a motor including a first stator coil and a second stator coil which are insulated from each other. The motor control device operates a first drive circuit connected to the first stator coil and a second drive circuit connected to the second stator coil.

2. Description of Related Art

For example, Japanese Patent Application Publication No. 2017-158230 (JP 2017-158230 A) describes a control device provided with separate microprocessor units (MPUs) (processing circuits) for controlling current flowing in each of two stator coils which are isolated from each other. More specifically, when controlling the current flowing in the stator coils, the two processing circuits detect a difference in their control timings and finely adjust their control timings to reduce the difference.

For example, when power supply voltage of a first processing circuit of the two processing circuits becomes lower than an operation guarantee voltage and is reset, a second processing circuit continues the control of the current. At this stage, when the reset first processing circuit is reactivated, a phenomenon in which the operations of the two processing circuits can not be synchronized occurs.

SUMMARY OF THE INVENTION

An object of the present invention is to provide a motor control device that can solve the above phenomenon.

1. One aspect of the present invention includes a motor control device configured to control a motor including a first stator coil and a second stator coil insulated from each other, the motor control device operating a first drive circuit connected to the first stator coil and a second drive circuit connected to the second stator coil. The motor control device includes a first processing circuit configured to output an operation signal to the first drive circuit to control current flowing in the first stator coil, and a second processing circuit configured to output an operation signal to the second drive circuit to control current flowing in the second stator coil. When the second processing circuit is performing control of current at activation of the first processing circuit, the first processing circuit executes a synchronization request process to output a request signal for requesting the second processing circuit to output a synchronization signal. In response to the request signal, the second processing circuit executes a resynchronization output process to output, to the first processing circuit, a synchronization signal synchronized with an execution timing of a periodic task executed by the second processing circuit.

In the above configuration, when both the first processing circuit and the second processing circuit are performing the control of current, only the first processing circuit may be reset due to a decrease in power supply voltage, for example. In this case, when the first processing circuit recovers from its reset state and is activated, the second processing circuit is performing the control of current. Therefore, in the above configuration, when the first processing circuit is activated while the second processing circuit is performing the control of current, the first processing circuit outputs a request signal to the second processing circuit, and the second processing circuit outputs, according to the request signal, a synchronization signal synchronized with the execution timing of the periodic task executed by the second processing circuit, to the first processing circuit. Thereby, the first processing circuit can execute the task in synchronization with the periodic task of the second processing circuit.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 5 is a time chart showing an example of the synchronization processing according to the first embodiment.

DETAILED DESCRIPTION OF EMBODIMENTS

Figure 1:
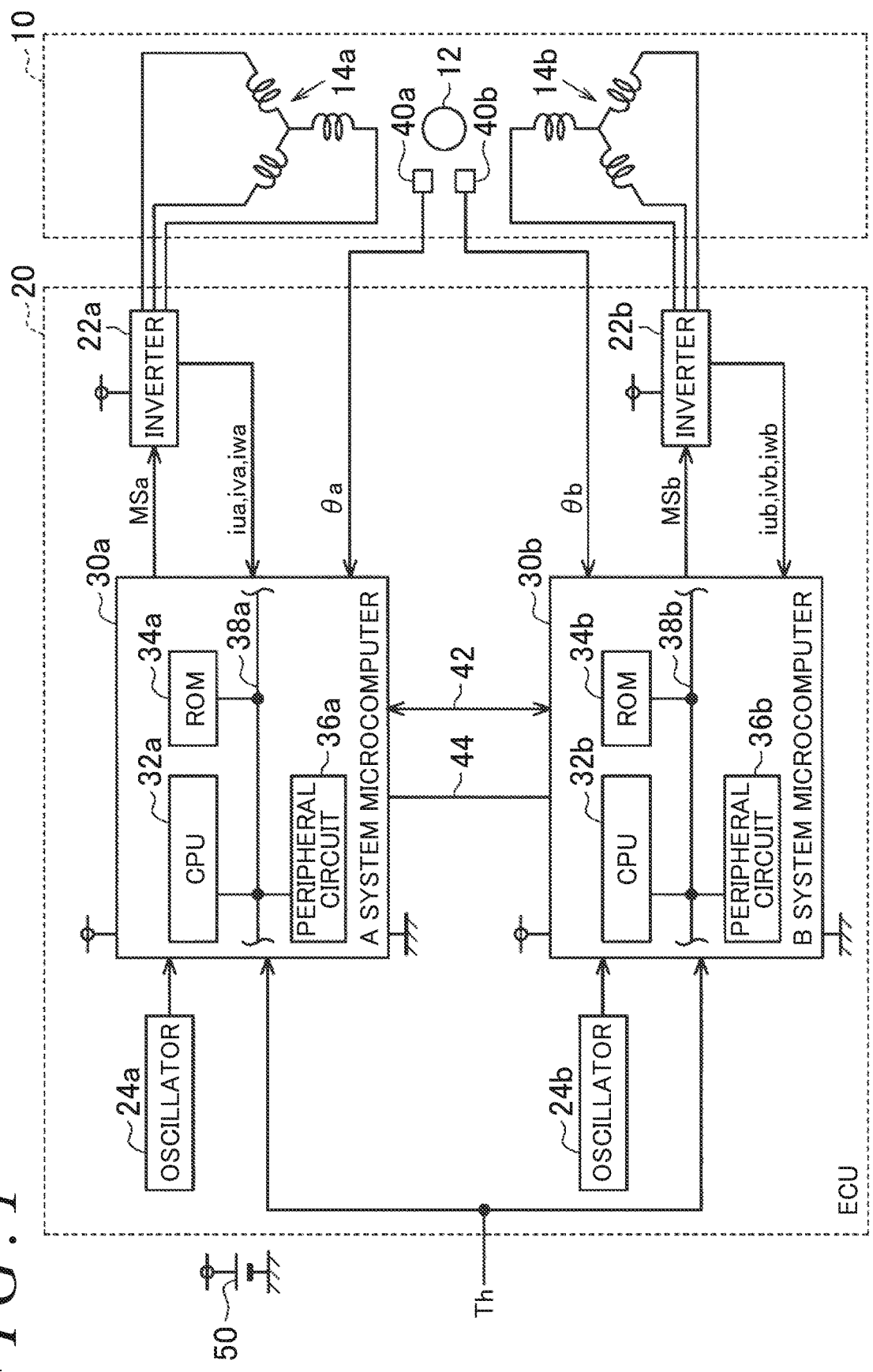
FIG. 1 is a diagram showing a control device and a motor according to a first embodiment.

Hereinafter, an embodiment of a motor control device according to the present invention will be described with reference to the drawings. A motor 10 shown in FIG. 1 serves as a power source in a steering operation actuator used for steering steered wheels. The motor 10 is provided with a rotor 12 and a pair of stator coils including an A system stator coil 14a and a B system stator coil 14b. A control device 20 controls the motor 10 by controlling torque that is a controlled variable of the motor 10. The control device 20 includes a circuit of system A and a circuit of system B, which correspond to the A system stator coil 14a and the B system stator coil 14b, respectively.

More specifically, the control device 20 includes the following as the circuit of system A: an A system inverter 22a connected to the A system stator coil 14a; an A system microcomputer 30a that controls current flowing in the A system stator coil 14a by outputting an operation signal MSa to the A system inverter 22a; and an A system oscillator 24a that outputs an external clock signal to the A system microcomputer 30a. The control device 20 includes the following as the circuit of system B: a B system inverter 22b connected to the B system stator coil 14b; a B system microcomputer 30b that controls current flowing in the B system stator coil 14b by outputting an operation signal MSb to the B system inverter 22b; and a B system oscillator 24b that outputs an external clock signal to the B system microcomputer 30b. Terminal voltage of a battery 50 is applied to the A system microcomputer 30a, the A system inverter 22a, the B system microcomputer 30b, and the B system inverter 22b.

The A system microcomputer 30a acquires a rotation angle θa of the rotor 12 detected by an A system angle sensor 40a and three-phase currents iva, iva, and iwa flowing in the A system stator coil 14a. The currents iva, iva, and iwa may be detected as, for example, a voltage drop of a shunt resistor connected to each leg of the A system inverter 22a.

The B system microcomputer 30b acquires a rotation angle θb of the rotor 12 detected by a B system angle sensor 40b and three-phase currents iub, ivb, iwb flowing in the B system stator coil 14b. The currents iub, ivb and iwb may be detected as, for example, a voltage drop of a shunt resistor connected to each leg of the B system inverter 22b.

In the following, when describing the system A and the system B collectively, a mark "#" is used. For example, expressions such as "# system inverter 22# is connected to # system stator coil 14#" is used. That is, the mark "#" represents upper cases A, B when placed before the term "system", and lower cases a, b when placed after symbols such as numbers and alphabets.

The # system microcomputer 30# is provided with a central processing unit (CPU) 32#, a read only memory (ROM) 34#, a peripheral circuit 36# and the like, which are connected via a bus line 38#. Here, the peripheral circuit 36# includes a circuit that generates a clock signal defining an internal operation based on the external clock signal, a power supply circuit, a reset circuit, and the like. The reset circuit is a circuit that resets the microcomputer 30# (CPU 32#) when the voltage applied to the # system microcomputer 30# (CPU 32#) falls outside a voltage range that can guarantee the operation of the # system microcomputer 30# (CPU 32 #).

The # system microcomputer 30# controls the current flowing in the # system stator coil 14# in order to control the torque of the motor 10 based on steering torque Th that is the torque input from a steering wheel.

Figure 2:
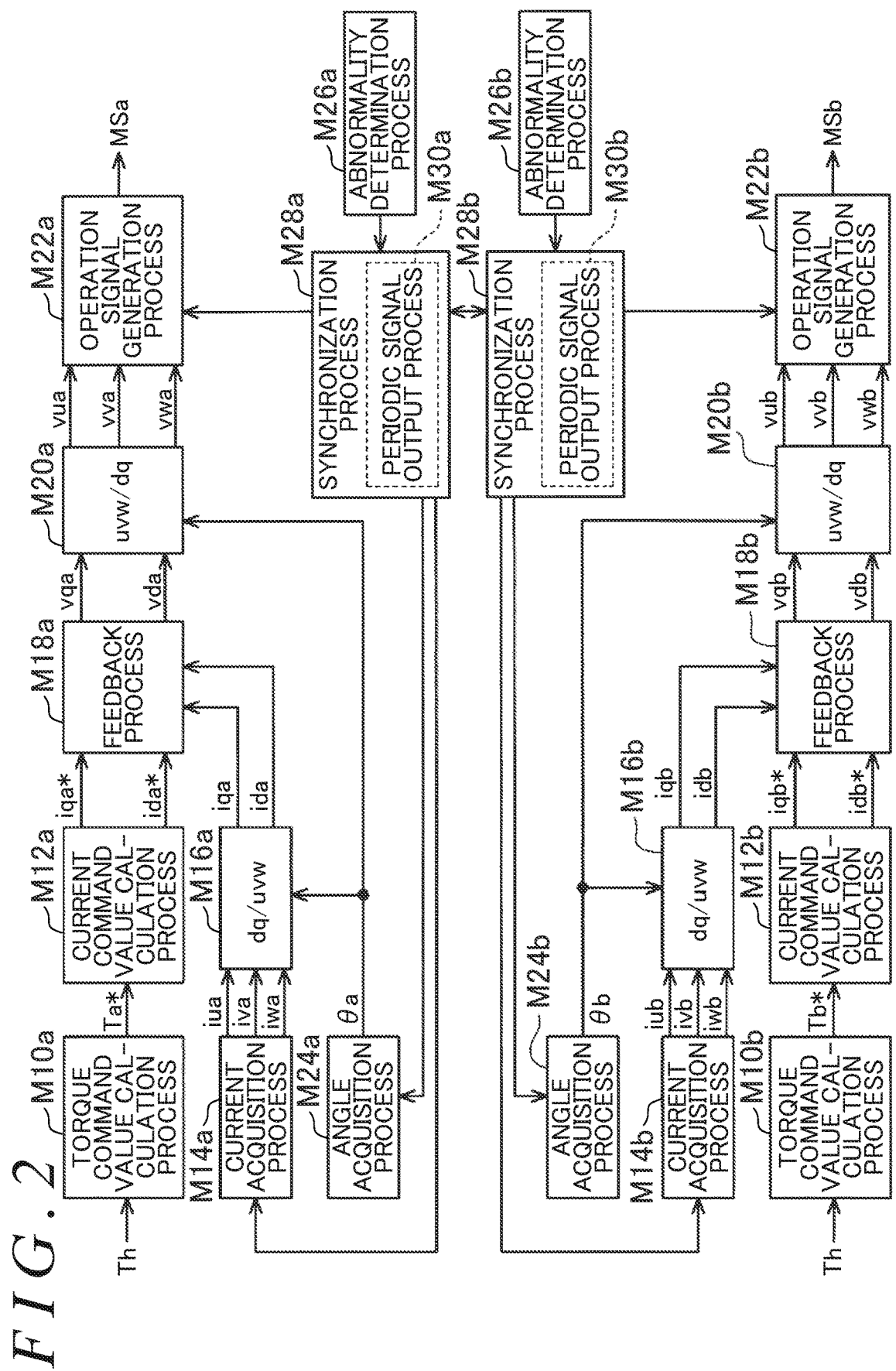
FIG. 2 is a diagram showing a part of processing executed by the control device according to the first embodiment.

FIG. 2 shows processing executed by the A system microcomputer 30a and the B system microcomputer 30b. The processing shown in FIG. 2 is achieved by the CPU 32# executing a program stored in the ROM 34#. In the following, when the processing executed by each of the A system microcomputer 30a and the B system microcomputer 30b is collectively referred to, the mark "#" is used.

A torque command value calculation process M10# is a process of calculating a torque command value T#* that indicates a torque required of the motor 10 to assist the driver's steering operation based on the steering torque Th. When both of the A system microcomputer 30a and the B system microcomputer 30b perform current control, the torque of the motor 10 is controlled to its required value by cooperation of the currents flowing in the A system stator coil 14a and the B system stator coil 14b. That is, when both of the A system microcomputer 30a and the B system microcomputer 30b perform current control, a sum of a torque command value Ta* and a torque command value Tb* is the torque required of the motor 10.

A current command value calculation process M12# is a process of calculating current command values id#*, iq#*, which are command values of the current flowing in the # system stator coil 14#, so as to control the torque of the motor 10 in accordance with the torque command value T#*.

A current acquisition process M14# is a process of acquiring currents iu#, iv#, and iw# flowing in the # system stator coil 14#. A dq conversion process M16# is a process of converting the three-phase currents iu#, iv#, and iw# into dq-axis currents id#, iq#. A feedback process M18# is a process of calculating dq-axis voltages vd#, vq# as operation variables for feedback control to cause the dq-axis currents id#, iq# to follow the current command values id#*, iq#*. A three-phase conversion process M20# is a process of converting the dq-axis voltages vd#, vq# into three-phase voltages vu#, vv#, and vw#. An operation signal generation process M22# is a process of outputting an operation signal MS# to the # system inverter 22# such that the voltage of each phase applied to the # system stator coil 14# by the # system inverter 22# becomes the voltages vu#, vv#, and vw#. The operation signal MS# here is an on/off operation signal of each switching element of the # system inverter 22#. Specifically, the operation signal generation process M22# includes a process of calculating the operation signal MS# by triangular wave pulse width modulation (PWM) processing.

An angle acquisition process M24# is a process of acquiring a rotation angle θ# detected by # system angle sensor 42# and outputting the acquired rotation angle θ# to the dq conversion process M16# or the three-phase conversion process M20#. An abnormality determination process M26# is a process of determining whether there is an abnormality in the operation of the # system microcomputer 30#. The abnormality determination process M26# includes a process of determining that the operation is abnormal when there is an abnormality in the process of controlling the current flowing in the # system stator coil 14# by the # system microcomputer 30#. Since the control of the current flowing in the # system stator coil 14# has not started when the # system microcomputer 30# is activated, the abnormality determination process M26# determines that there is an abnormality.

Figure 3:
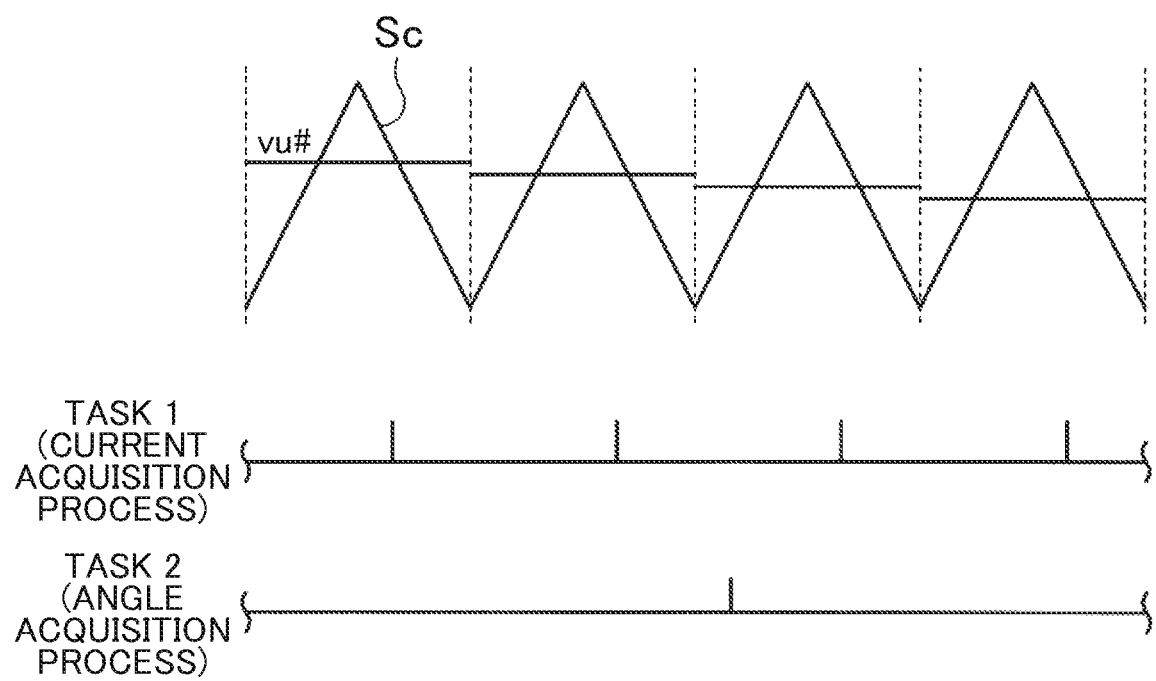
FIG. 3 is a time chart showing an example of execution timings of a first task and a second task according to the first embodiment.

A synchronization process M28# is a process of synchronizing the operations of the current acquisition process M14#, the angle acquisition process M24#, and the operation signal generation process M22# based on the internal clock signal. FIG. 3 shows an example of operations of the current acquisition process M14#, the angle acquisition process M24#, and the operation signal generation process M22#. The operation signal MS# is generated based on comparison in magnitude between a carrier Sc in a triangular wave shape and the voltages vu#, vv#, and vw# shown in FIG. 3. In FIG. 3, only the voltage vu# of the U phase is shown as an example. As shown in FIG. 3, as task 1, the current acquisition process M14# is executed in the same cycle as the cycle of the carrier Sc. Every time the currents iu#, iv#, and iw# are newly acquired by the current acquisition process M14#, the voltages vu#, vv#, and vw# are updated, and thus the operation signal MS# is updated. Here, an execution timing of the current acquisition process M14# (execution timing of task 1) is shifted as much as possible from an output timing of the operation signal MS#. This is because, in view of occurrence of ringing in the current flowing in the # system stator coil 14# due to the update of the operation signal MS#, the currents iu#, iv#, and iw# can be acquired at a timing when the ringing has attenuated.

As shown in FIG. 3, as task 2, the angle acquisition process M24# is executed at a cycle longer than the cycle of the carrier Sc. The cycles of periodic tasks executed by the # system microcomputer 30# such as task 1 and task 2 are all multiples of the cycle of the internal clock signal. In the present embodiment, task 1 has the shortest cycle among the cycles of the periodic tasks executed by both the A system microcomputer 30a and the B system microcomputer 30b. Furthermore, in the present embodiment, all the cycles of the periodic tasks executed by the # system microcomputer 30# are divisors of the longest cycle among all the cycles.

As shown in FIG. 2, the synchronization process M28# includes a periodic signal output process M30#. The periodic signal output process M30# is a process of outputting a synchronization signal synchronized with a cycle of a task with the shortest cycle, among the periodic tasks executed by both the A system microcomputer 30a and the B system microcomputer 30b, via a communication line 44 shown in FIG. 1. When the abnormality determination process M26# determines that there is an abnormality, the periodic signal output process M30# stops outputting the synchronization signal. The synchronization process M28# includes a process of synchronizing execution of periodical tasks between system A and system B via the communication line 44.

There are two reasons for synchronizing the execution of periodical tasks between system A and system B. The first reason is to suppress torque ripple. That is, for example, when the execution timing of task 1 differs between system A and system B, the update timing of the operation signal MSa of system A and the execution timing of task 1 of system B may become close to each other. In this case, noise resulting from the ringing of the currents iva, iva, and iwa flowing in the A system stator coil 14a may be superimposed on the currents iub, ivb, and iwb acquired in the current acquisition process M14b. Further, for example, when the execution timing of task 2 differs between system A and system B, even if the currents iub, ivb, and iwb and the currents iva, iva, and iwa are equal to each other, the voltages vua, vva, and vwa and the voltages vub, vvb, and vwb may differ from each other because the rotation angles θa, θb used differ from each other.

The second reason for synchronizing the execution of periodical tasks in system A and system B is because tasks for executing bi-directional communication via a serial line 42 shown in FIG. 1, for example, requires that system A and system B be synchronized. In the present embodiment, the execution timings of all periodic tasks can be synchronized by synchronizing the execution timings of the task having the longest cycle, among the periodic tasks executed by both the A system microcomputer 30a and the B system microcomputer 30b.

Figure 4A:
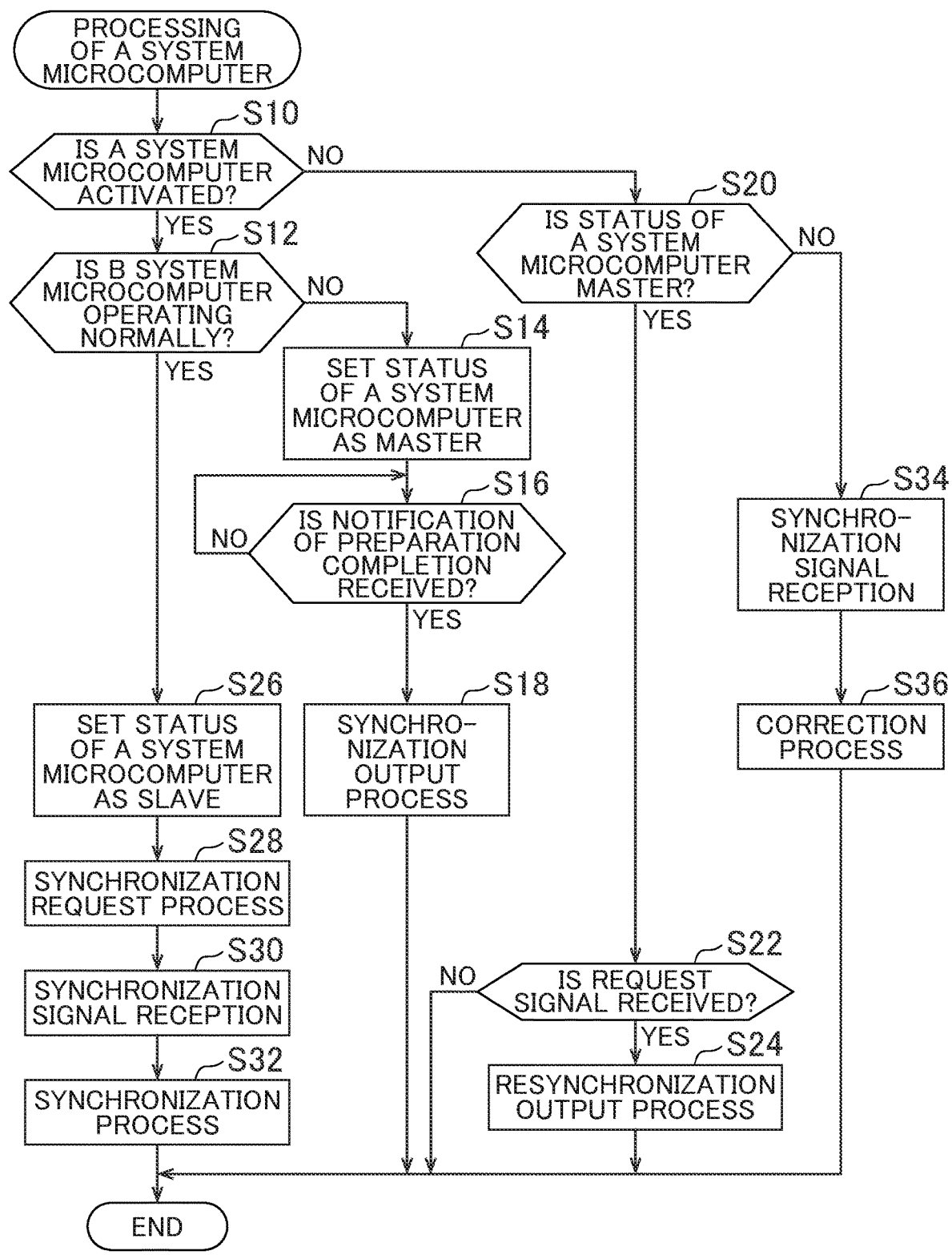
FIG. 4A is a flowchart showing a procedure of synchronization processing according to the first embodiment.
Figure 4B:
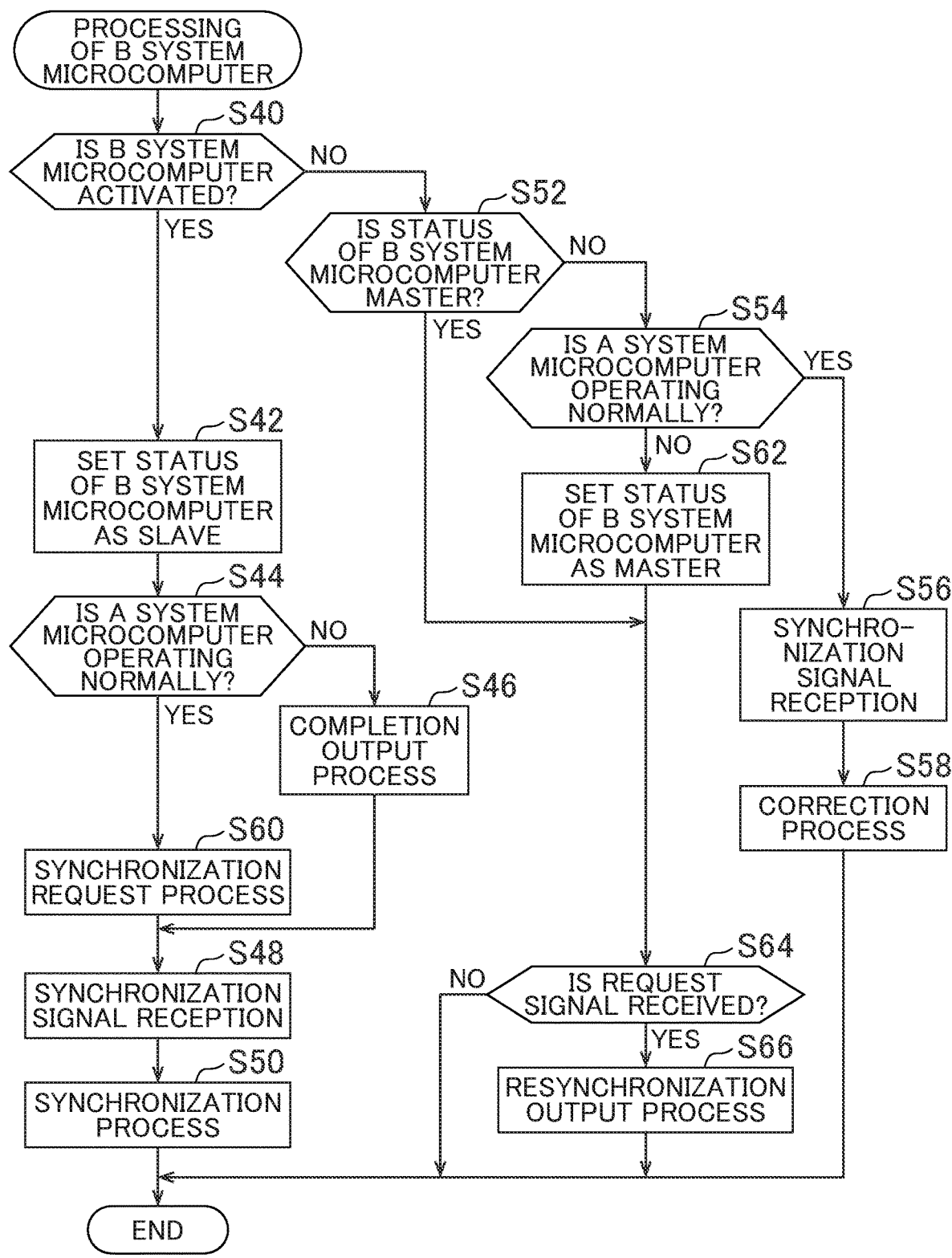
FIG. 4B is a flowchart showing a procedure of the synchronization processing according to the first embodiment.

FIG. 4A shows a procedure of a synchronization process M28a, and FIG. 4B shows a procedure of a synchronization process M28b. The processes shown in FIGS. 4A and 4B are achieved by the CPU 32# repeatedly executing a program stored in the ROM 34# whenever, for example, a predetermined execution condition is satisfied. In the following, a step number of each process is expressed as a number preceded by the letter S. Hereinafter, the processes shown in FIGS. 4A and 4B will be described according to a time series of events that may actually occur from the time of activation of the control device 20.

In the series of processes shown in FIG. 4A, a CPU 32a first determines whether the A system microcomputer 30a is activated (S10). Since the A system microcomputer 30a is activated when the control device 20 is activated, the CPU 32a determines that the A system microcomputer 30a is activated (S10: YES), and determines whether the B system microcomputer 30b is operating normally (S12). This process is a process of determining that the B system microcomputer 30b is operating normally when a periodic signal is output by a periodic signal output process M30b on the B system microcomputer 30b side. Since the B system microcomputer 30b is activated when the control device 20 is activated, control of the current flowing in the B system stator coil 14b is not yet performed in the B system microcomputer 30b, and an abnormality determination process M26b determines this as an abnormality. As a result, the process of outputting the periodic signal by the periodic signal output process M30b is prohibited. Therefore, the CPU 32a determines that the operation of the B system microcomputer 30b is not normal (S12: NO), and sets the status of the A system microcomputer 30a as a master (S14).

Meanwhile, in the series of processes shown in FIG. 4B, the CPU 32b first determines whether the B system microcomputer 30b is activated (S40). Since the B system microcomputer 30b is activated when the control device 20 is activated, the CPU 32b determines that the B system microcomputer 30b is activated (S40: YES), and sets the status of the B system microcomputer 30b as a slave (S42). Next, the CPU 32b determines whether the A system microcomputer 30a is operating normally (S44). This process is a process of determining that the A system microcomputer 30a is operating normally when the periodic signal is output by the periodic signal output process M30a on the A system microcomputer 30a side. Since the A system microcomputer 30a is activated when the control device 20 is activated, control of the current flowing in the A system stator coil 14a is not yet performed in the A system microcomputer 30a, and the abnormality determination process M26a determines this as an abnormality. As a result, the process of outputting the periodic signal by the periodic signal output process M30a is prohibited. Therefore, the CPU 32b determines that the operation of the A system microcomputer 30a is not normal (S44: NO). As soon as preparation for periodically executing each task on the B system microcomputer 30b side is completed, the CPU 32b executes a completion output process to output a notification of preparation completion for notifying that preparation has been completed via the communication line 44 (S46).

Meanwhile, as shown in FIG. 4A, the CPU 32a stands by until the notification of preparation completion is received (S16: NO). Upon receiving the notification of preparation completion (S16: YES), the CPU 32a executes a synchronization output process of outputting, via the communication line 44, the synchronization signal synchronized with the execution timing, in the A system microcomputer 30a, of the task having the longest cycle among the periodic tasks executed by both the A system microcomputer 30a and the B system microcomputer 30b (S18). At this time, the CPU 32a starts periodic task execution.

Thereby, as shown in FIG. 4B, upon receiving the synchronization signal (S48), the CPU 32b starts, based on the received synchronization signal, periodical execution of each task in the B system microcomputer 30b such that the execution timing of each periodic task is synchronized with that on the A system microcomputer 30a side (S50). Thereby, control of the current flowing in the A system stator coil 14a by the A system microcomputer 30a and control of the current flowing in the B system stator coil 14b by the B system microcomputer 30b are performed.

Thereafter, as shown in FIG. 4B, upon determining that the B system microcomputer 30b is not activated (S40: NO), the CPU 32b determines whether the status of the B system microcomputer 30b is the master (S52). Upon determining that the status of the B system microcomputer 30b is the slave (S52: NO), the CPU 32b determines whether the A system microcomputer 30a is operating normally (S54).

Upon determining that the A system microcomputer 30a is operating normally (S54: YES), the CPU 32b receives the periodic signal output from the A system microcomputer 30a (S56). Then, based on the periodic signal, the CPU 32b corrects the execution timing of the task on the B system microcomputer 30b side as needed, thereby executing a process to approximate the execution timing of the task on the B system microcomputer 30b side to the execution timing of the task on the A system microcomputer 30a side (S58). Specifically, the CPU 32a appropriately corrects the execution timing by a time that is an integral multiple of the cycle of the internal clock, regarding one cycle of the internal clock as a minimum unit.

The following description involves, for example, a case where the terminal voltage of the battery 50 decreases and only the voltage applied to the B system microcomputer 30b falls below the operation guarantee voltage due to factors such as individual differences in the resistance value of the electric path between system A and system B, so that the B system microcomputer 30b is reset.

In this case, the B system microcomputer 30b is reactivated by a rise in the applied voltage to some extent. In this case, the CPU 32b determines that the B system microcomputer 30b is activated (S40: YES), and after executing the process of S42, determines whether the A system microcomputer 30a is operating normally (S44). When the B system microcomputer 30b is activated after only the B system microcomputer 30b is reset, control of the current flowing in the A system stator coil 14a is executed by the A system microcomputer 30a, and the periodic signal is output from the A system microcomputer 30a. Therefore, the CPU 32b determines that the A system microcomputer 30a is operating normally (S44: YES), and executes a synchronization request process that outputs, via the communication line 44, a request signal for requesting the A system microcomputer 30a to output the synchronization signal (S60).

Meanwhile, as shown in FIG. 4A, since the A system microcomputer 30a is not reset, the CPU 32a determines that the A system microcomputer 30a is not activated (S10: NO), and determines whether the status of the A system microcomputer 30a is the master (S20). Upon determining that the status of the A system microcomputer 30a is the master (S20: YES), the CPU 32a determines whether a request signal has been received (S22). Upon determining that the request signal has been received (S22: YES), the CPU 32a executes a resynchronization output process to output, via the communication line 44, a synchronization signal synchronized with the execution timing, in the A system microcomputer 30a, of the task having the longest cycle among the periodic tasks executed by both the A system microcomputer 30a and the B system microcomputer 30b (S24).

Meanwhile, as shown in FIG. 4B, the CPU 32b receives the synchronization signal output by the resynchronization output process (S48), and executes the process of S50 based on this synchronization signal. The following description involves, for example, a case where the terminal voltage of the battery 50 decreases and only the voltage applied to the A system microcomputer 30a falls below the operation guarantee voltage due to factors such as individual differences in the resistance value of the electric path between system A and system B, so that the A system microcomputer 30a is reset.

In this case, the A system microcomputer 30a is reactivated by the rise in the applied voltage to some extent. In this case, the CPU 32a determines that the A system microcomputer 30a is activated (S10: YES), and determines whether the B system microcomputer 30b is operating normally (S12). When the A system microcomputer 30a is activated after only the A system microcomputer 30a is reset, control of the current flowing in the B system stator coil 14b is executed by the B system microcomputer 30b, and the periodic signal is output from the B system microcomputer 30b. Therefore, the CPU 32a determines that the B system microcomputer 30b is operating normally (S12: YES), and sets the status of the A system microcomputer 30a as the slave (S26). Then, the CPU 32a executes a synchronization request process of outputting a request signal for requesting the B system microcomputer 30b to output the synchronization signal via the communication line 44 (S28).

Meanwhile, as shown in FIG. 4B, upon determining that the B system microcomputer 30b is not activated (S40: NO) due to continuation of the control of the current flowing in the B system stator coil 14b, the CPU 32b determines whether the status of the B system microcomputer 30b is the master (S52). Upon determining that the status of the B system microcomputer 30b is the slave (S52: NO), the CPU 32b determines whether the A system microcomputer 30a is operating normally (S54). Upon determining that the A system microcomputer 30a is not operating normally (S54: NO), the CPU 32b sets the status of the B system microcomputer 30b as the master (S62). Then, when completing the process of S62 or making an affirmative determination in the process of S52, the CPU 32b determines whether a request signal has been received (S64). Upon determining that the request signal has been received (S64: YES), the CPU 32b executes a resynchronization output process to output, via the communication line 44, the synchronization signal synchronized with the execution timing, in the B system microcomputer 30b, of the task having the longest cycle among the periodic tasks executed by both the A system microcomputer 30a and the B system microcomputer 30b (S66).

Meanwhile, as shown in FIG. 4A, upon receiving the synchronization signal (S30), the CPU 32b starts, based on the received synchronization signal, periodical execution of each task in the A system microcomputer 30a such that the execution timing of each periodic task is synchronized with that on the B system microcomputer 30b side (S32). Thereafter, the CPU 32a determines that the status of the A system microcomputer 30a is the slave (S20: NO), and receives the periodic signal output from the B system microcomputer 30b (S34). Then, based on the periodic signal, the CPU 32a corrects the execution timing of the task on the A system microcomputer 30a side as needed, thereby executing a process to approximate the execution timing of the task on the A system microcomputer 30a side to the execution timing of the task on the B system microcomputer 30b side (S36).

When completing the processes of S18, S24, S32, and S36, or making a negative determination in the process of S22, the CPU 32a temporarily ends the series of processes shown in FIG. 4A. Meanwhile, when completing the processes of S50, S58, and S66, or making a negative determination in the process of S64, the CPU 32b temporarily ends the processes shown in FIG. 4B.

The processes after both the A system microcomputer 30a and the B system microcomputer 30b are reset due to the decrease in the terminal voltage of the battery 50 are not described in the above description. In that case, the processes are the same as those when the control device 20 is activated.

The effects of the present embodiment will be described below. FIG. 5 shows a case where only the B system microcomputer 30b is reset after the control device 20 is activated. In this case, the CPU 32b outputs the request signal to the A system microcomputer 30a at time t1. After receiving the request signal, the CPU 32a outputs the synchronization signal synchronized with the execution timing of the task n having the longest cycle, among the periodic tasks executed by both the A system microcomputer 30*a* and the B system microcomputer 30*b*. That is, even if the execution timings of task 1, task 2, etc. arrive, the CPU 32*a* stands by without outputting the synchronization signal until the execution timing of task n arrives. At time t2, the CPU 32*a* outputs the synchronization signal upon arrival of the execution timing of task n, that is, the execution timing of all periodic tasks. The execution timing of task n is the latest one of the execution timings of the periodic tasks appearing after the reception of the request signal. In other words, the execution timings of all periodic tasks appear at or before the appearance of the execution timing of task n after the reception of the request signal. With the output of the synchronization signal synchronized with the execution timing of task n, the CPU 32*b* synchronizes the execution timing of all periodic tasks with the synchronization signal. Note that synchronizing the execution timings of all periodic tasks with the synchronization signal does not mean that the execution timings of multiple periodic tasks having the same cycle coincide with each other. That is, as described above, although the cycle of the current acquisition process M14# serving as task 1 is the same as the update cycle of the operation signal MS#, their execution timings are shifted from each other. Therefore, tasks whose execution timings synchronize with the synchronization signal may include not only tasks executed immediately after reception of the synchronization signal, but also tasks executed after a predetermined amount of time has elapsed from reception of the synchronization signal.

Thus, by setting the synchronization signal as a signal synchronized with the execution timing of task n, all of the periodic tasks executed by the A system microcomputer 30*a* and all of the corresponding periodic tasks executed by the B system microcomputer 30*b* can be synchronized. Thereby, even if one of the A system microcomputer 30*a* and the B system microcomputer 30*b* is reset, it is possible to cause the control device 20 to quickly return to its normal state in which the control of the current flowing in the A system stator coil 14*a* by the A system microcomputer 30*a* and the control of the current flowing in the B system stator coil 14*b* by the B system microcomputer 30*b* are performed. Therefore, compared to the case where only one of the control of the current flowing in the A system stator coil 14*a* by the A system microcomputer 30*a* and the control of the current flowing in the B system stator coil 14*b* by the B system microcomputer 30*b* is continued, the assist in the driver's steering operation can be improved. When only one of the control of the current flowing in the A system stator coil 14*a* by the A system microcomputer 30*a* and the control of the current flowing in the B system stator coil 14*b* by the B system microcomputer 30*b* is continued, it is difficult for the motor 10 to constantly generate the amount of torque that is generated when both the control of the current flowing in the A system stator coil 14*a* by the A system microcomputer 30*a* and the control of the current flowing in the B system stator coil 14*b* by the B system microcomputer 30*b* are performed.

According to the present embodiment described above, the following effects can further be obtained.

(1) When only the A system microcomputer 30*a* is reset and reactivated after the control device 20 is activated, the A system microcomputer 30*a*, serving as the slave, executes correction process to match the execution timing of the task thereof with the execution timing of the task in the B system microcomputer 30*b*. As a result, it is possible to prevent the microcomputer that continues to operate normally from executing the correction process.

The relationship between the matters described above in the present embodiment and the matters described above in the SUMMARY OF THE INVENTION is as follows. In the following, the relationship is described based on each solution number in the SUMMARY OF THE INVENTION. [1] The following cases 1 and 2 will be described separately. In case 1, the first stator coil, the first drive circuit, and the first processing circuit correspond to the A system stator coil 14*a*, the A system inverter 22*a*, and the A system microcomputer 30*a*, respectively. In case 2, the first stator coil, the first drive circuit, and the first processing circuit correspond to the B system stator coil 14*b*, the B system inverter 22*b*, and the B system microcomputer 30*b*, respectively. In case 1, the synchronization request process corresponds to the process of S28, and the resynchronization output process corresponds to the process of S66. In case 2, the synchronization request process corresponds to the process of S60, and the resynchronization output process corresponds to the process of S24. [2] In case 1, the periodic signal output process corresponds to the periodic signal output process M30*b*, and the correction process corresponds to the process of S36. In case 2, the periodic signal output process corresponds to the periodic signal output process M30*a*, and the correction process corresponds to the process of S58. [3] The solution corresponds only to case 1. The completion output process corresponds to the process of S46, and the synchronization output process corresponds to the process of S18. [4] The solution corresponds only to case 1. The periodic signal output process corresponds to the periodic signal output process M30*a*, and the correction process corresponds to the process of S58. [5] The first task corresponds to the current acquisition processes M14*a* and M14*b*, and the second task corresponds to the angle acquisition processes M24*a* and M24*b*. [6] The first current acquisition process and the second current acquisition process respectively correspond to the current acquisition process M14*a* and the current acquisition process M14*b*, and the first angle acquisition process and the second angle acquisition process respectively correspond to the angle acquisition process M24*a* and the angle acquisition process M24*b*. The first current control process and the second current acquisition process correspond to feedback processes M18*a* and M18*b*, the three-phase conversion processes M20*a* and M20*b*, and operation signal generation processes M22*a* and M22*b*.

At least one of the matters of the embodiment may be changed as follows. Regarding the task in the embodiment described above, the cycles of the periodic tasks executed by both the A system microcomputer 30*a* and the B system microcomputer 30*b* are divisors of the longest execution cycle among the periodic tasks. However, the present invention is not limited thereto. For example, there may be cases where the execution cycle is not a divisor of the cycle of the task having the longest execution cycle, although the cycles of all tasks are multiples of the cycle of the internal clock signal.

Regarding the periodic signal output process in the embodiment described above, the periodic signal corresponding to the cycle of the task having the shortest execution cycle among the tasks executed by both the A system microcomputer 30*a* and the B system microcomputer 30*b* is output. However, the present invention is not limited thereto. For example, a periodic signal corresponding to a cycle of a task having an intermediate execution cycle between the task having the shortest execution cycle and the task having the longest execution cycle may be output.

In the embodiment described above, the periodic signal output process is constantly executed regardless of whether the status of the microcomputer is the master or the slave. However, the present invention is not limited thereto. For example, the periodic signal output process may be executed only in the microcomputer whose status is the master.

Regarding the resynchronization output process in the present embodiment described above, when one of the A system microcomputer 30a and the B system microcomputer 30b receives the synchronization request signal, the synchronization signal synchronized with the execution timing of the task having the longest execution cycle, among the periodic tasks executed by both the A system microcomputer 30a and the B system microcomputer 30b, is output. However, the present invention is not limited thereto. For example, as described above in the section regarding the tasks, if there is a periodic task whose execution cycle is not a divisor of the execution cycle of the task having the longest execution cycle, the synchronization signal may be output at a timing that corresponds to an execution timing of the task having the longest execution cycle and is synchronized with the least common multiple of the cycles of all the periodic tasks. Thereby, since the output timing of the synchronization signal is synchronized with the execution timings of all the periodic tasks, all the periodic tasks executed by the A system microcomputer 30a and all the corresponding periodic tasks executed by the B system microcomputer 30b can be synchronized.

Note that it is not essential to synchronize all the periodic tasks executed by the A system microcomputer 30a and all the corresponding periodic tasks executed by the B system microcomputer 30b. For example, the synchronization signal may be output at a timing synchronized with the cycle of the least common multiple of the cycle of the bidirectional communication process via the serial line 42, the cycle of the angle acquisition process M24#, and the cycle of the current acquisition process M14#, as well as the execution timing of the current acquisition process M14#.

Also, for example, as described above in the section regarding the periodic signal output process, when a periodic signal corresponding to a task having an intermediate execution cycle is output, it is desirable to output a synchronization signal synchronized with the execution timing of a task having a longer execution cycle than the task corresponding to the periodic signal. As a result, a task whose execution cycle is longer than the cycle of the task corresponding to the periodic signal executed by the A system microcomputer 30a and a task whose execution cycle is longer than the cycle of the task corresponding to the periodic signal executed by the B system microcomputer 30b can be synchronized.

Regarding the current control process in the embodiment described above, the feedback process M18#, the three-phase conversion process M20#, and the operation signal generation process M22# are exemplified as the current control process for controlling the current flowing in the stator coil to follow the command value. However, the present invention is not limited thereto. For example, model predictive control may be performed to select an actual switching mode based on the difference between the predicted value and the command value of the current that is output in the case where the switching mode of the inverter is variously set based on the current flowing in the stator coil. Even in this case, it is desirable to make the update cycle of the rotation angle used to calculate the predicted value longer than the update cycle of the switching mode or the current.

Regarding the master and the slave in the embodiment described above, the A system microcomputer 30a is determined as the master by default, and the B system microcomputer 30b is used as the master only when the A system microcomputer 30a recovers from its reset state while the B system microcomputer 30b is operating normally. However, the present invention is not limited thereto. For example, one of the A system microcomputer 30a and the B system microcomputer 30b that has been the master immediately before the stop of the A system microcomputer 30a and the B system microcomputer 30b may become the master when activated thereafter. This can be achieved, for example, by providing each of the A system microcomputer 30a and the B system microcomputer 30b with an electrically rewritable non-volatile memory, and storing the status in the non-volatile memory.

Note that it is not essential to switch the status. The status may be fixed such that, for example, the A system microcomputer 30a is the master and the B system microcomputer 30b is the slave. In this case, even if the A system microcomputer 30a recovers from its reset state and is activated while the B system microcomputer 30b continues its normal operation, the B system microcomputer 30b may receive a periodic signal of the A system microcomputer 30a and may execute a correction process to correct the execution cycle of its own task. Note that when the A system microcomputer 30a recovers from its reset state while the B system microcomputer 30b is operating normally, the A system microcomputer 30a outputs a synchronization request signal to the B system microcomputer 30b.

Regarding the processing circuit in the embodiment described above, although the peripheral circuit 36# includes the reset circuit, the present invention is not limited thereto. The reset circuit may be provided outside the # system microcomputer 30#, and the reset voltage of the reset circuit may be applied to the # system microcomputer 30#.

In the embodiment described above, the ROM is exemplified as a program storage device constituting the processing circuit, and the type of the ROM is not specified. For example, a non-rewritable memory or an electrically rewritable non-volatile memory may be used. Furthermore, the program storage device is not limited to the ROM.

The processing circuit is not limited to a software processing circuit including a program storage device storing a program and a CPU executing the program, and may be a dedicated hardware circuit such as an application specific integrated circuit (ASIC) that executes predetermined processing.

Regarding the stator coil, the motor, and the drive circuit in the embodiment described above, the three-phase inverter has been exemplified as the drive circuit, but the present invention is not limited thereto. For example, a direct current (DC) motor may be used as the motor and an H bridge circuit may be used as the drive circuit.

Regarding the control device in the embodiment described above, a device having two systems (system A and system B) has been exemplified, but the present invention is not limited thereto. The control device may include three or more stator coils, three or more drive circuits, and three or more processing circuits, to provide a providing system C in addition to system A and system B, for example. In this case, it is desirable to use any one system as the master and the remaining systems as the slaves. This can be achieved by a simple change in the processes shown in FIGS. 4A and 4B by, for example, setting a priority for the master. That is, for example, assuming that the priority for the master is set in the order of system A, system B, and system C, when system A is reset while system B and system C are operating normally, system B becomes the master.

In addition, the sensor for detecting the rotation angle of the motor 10 is not limited to the rotation angle sensors separately provided for each system, and may be, for example, a single rotation angle sensor. In the embodiment described above, the sensor for detecting the steering torque Th is not particularly mentioned. The sensors may differ from one another for each system, and alternatively, the detection value of a single sensor may be shared between the systems.

What is claimed is:

1. A motor control device configured to control a motor including a first stator coil and a second stator coil insulated from each other, the motor control device operating a first drive circuit connected to the first stator coil and a second drive circuit connected to the second stator coil, the motor control device comprising:
   a first processing circuit configured to output an operation signal to the first drive circuit to control current flowing in the first stator coil; and
   a second processing circuit configured to output an operation signal to the second drive circuit to control current flowing in the second stator coil, wherein:
   when the second processing circuit is performing control of current at activation of the first processing circuit, the first processing circuit executes a synchronization request process to output a request signal for requesting the second processing circuit to output a synchronization signal; and
   in response to the request signal, the second processing circuit executes a resynchronization output process to output, to the first processing circuit, a synchronization signal synchronized with an execution timing of a periodic task executed by the second processing circuit.

2. The motor control device according to claim 1, wherein:
   the second processing circuit executes a periodic signal output process to output a periodic signal according to the periodic task executed by the second processing circuit; and
   the first processing circuit executes, after starting the periodic task of the first processing circuit according to the synchronization signal output by the second processing circuit in the resynchronization output process, a correction process to correct a timing of the periodic task executed by the first processing circuit based on the periodic signal output by the second processing circuit in the periodic signal output process.

3. The motor control device according to claim 1, wherein:
   when the first processing circuit is not performing control of current at activation of the second processing circuit, the second processing circuit executes a completion output process to output a notification of preparation completion to the first processing circuit; and
   the first processing circuit executes a synchronization output process to output, to the second processing circuit, a synchronization signal synchronized with an execution timing of a periodic task executed by the first processing circuit, when the notification of preparation completion executed in the completion output process is received.

4. The motor control device according to claim 3, wherein:
   the first processing circuit executes a periodic signal output process to output a periodic signal according to the periodic task executed by the first processing circuit; and
   the second processing circuit executes, after starting the periodic task of the second processing circuit according to the synchronization signal output by the first processing circuit in the synchronization output process, a correction process to correct a timing of the periodic task executed by the second processing circuit based on the periodic signal output by the first processing circuit in the periodic signal output process.

5. The motor control device according to claim 1, wherein:
   the periodic task is a first task;
   the first processing circuit and the second processing circuit execute a second task that is periodically executed in a cycle longer than an execution cycle of the first task; and
   the synchronization signal is a signal synchronized with execution timings of both the first task and the second task.

6. The motor control device according to claim 5, wherein:
   the first processing circuit executes a first current acquisition process to acquire a detected value of current flowing in the first stator coil, a first angle acquisition process to acquire a detected value of a rotation angle of the motor, and a first current control process to control the current flowing in the first stator coil to follow a command value based on the detected value of the current acquired through the first current acquisition process and the detected value of the rotation angle of the motor acquired through the first angle acquisition process;
   the second processing circuit executes a second current acquisition process to acquire a detected value of current flowing in the second stator coil, a second angle acquisition process to acquire a detected value of the rotation angle of the motor, and a second current control process to control the current flowing in the second stator coil to follow a command value based on the detected value of the current acquired through the second current acquisition process and the detected value of the rotation angle of the motor acquired through the second angle acquisition process; and
   the first task corresponds to the first current acquisition process and the second current acquisition process, and the second task corresponds to the first angle acquisition process and the second angle acquisition process.

* * * * *